(12) United States Patent
Kozakura

(10) Patent No.: US 9,154,693 B2
(45) Date of Patent: Oct. 6, 2015

(54) PHOTOGRAPHING CONTROL APPARATUS AND PHOTOGRAPHING CONTROL METHOD

(71) Applicant: CANON KABUSHIKI KAISHA, Tokyo (JP)

(72) Inventor: Masato Kozakura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 122 days.

(21) Appl. No.: 13/926,024

(22) Filed: Jun. 25, 2013

(65) Prior Publication Data

US 2013/0342712 A1 Dec. 26, 2013

(30) Foreign Application Priority Data

Jun. 26, 2012 (JP) ................................. 2012-143432

(51) Int. Cl.
*H04N 5/232* (2006.01)

(52) U.S. Cl.
CPC ....... *H04N 5/23222* (2013.01); *H04N 5/23238* (2013.01); *H04N 5/23296* (2013.01)

(58) Field of Classification Search
CPC ............ H04N 5/23225; H04N 1/0041; H04N 1/00352
USPC ................................... 348/211.99–211.9, 143
See application file for complete search history.

(56) References Cited

U.S. PATENT DOCUMENTS

| | | | | |
|---|---|---|---|---|
| 7,289,143 | B2 * | 10/2007 | Takagi et al. .............. | 348/222.1 |
| 8,363,105 | B2 * | 1/2013 | Ohnishi .......................... | 348/155 |
| 8,429,703 | B2 * | 4/2013 | Kurosawa ...................... | 725/105 |
| 2001/0019355 | A1 | 9/2001 | Koyanagi et al. | |

* cited by examiner

*Primary Examiner* — Tuan Ho
(74) *Attorney, Agent, or Firm* — Carter, DeLuca, Farrell & Schmidt, LLP

(57) ABSTRACT

A photographing control apparatus for controlling a shooting direction of a camera determines as to whether the shooting direction of the camera is controlled or not according to a designation of a position in a display area in which an image captured by the camera is displayed, based on a parameter derived by the camera.

30 Claims, 9 Drawing Sheets

PHOTOGRAPHING CONTROL APPARATUS AND PHOTOGRAPHING CONTROL METHOD

BACKGROUND OF THE INVENTION

1. Field of the Invention

The present invention relates to a photographing control apparatus and a photographing control method, and particularly relates to a control apparatus and a control method for controlling a shooting direction of a camera.

2. Description of the Related Art

Conventionally, a viewer client application connected to a camera adaptable to a network can control the camera and receive a video through the network. In addition, there is a viewer client application which can control the camera by designating an arbitrary position in an image display area of an application screen, with a pointer of a mouse, or the like.

As described in US 2001/019355 A1, for instance, a viewer application is proposed which controls a camera so that when a user has designated an arbitrary position in a panorama image, the position comes to the center.

The imaging apparatus described in US 2001/019355 A1 controls the camera so that the designated position in a panorama image display area comes to the center of the image, but actually is restricted by its mechanism, and accordingly occasionally cannot necessarily control the camera so that the designated position comes to the center of the image.

FIG. 2 is a conceptual view illustrating a relationship between a quantity of moving of a lens barrel unit and an optical zoom.

The lens barrel unit 20 is pan driven by a motor. The quantity of moving per one pulse to be given to the motor is determined as characteristics of the motor, and the quantity of moving is relatively small with respect to an angle of view in the approximate boundary 22 of an optical wide, but is relatively large with respect to the angle of view in the approximate boundary 21 of an optical tele. This tendency becomes more remarkable as a zooming ratio becomes higher.

An influence of this quantity of moving on a screen to be viewed by a user on the viewer client application is considered as follows. For instance, suppose that a user designates a position of a pointer 301 in a display screen 300 in FIG. 3, in the case of the approximate boundary of tele. In this case, the user expects that the camera is controlled so that the position designated by the pointer 301 comes to the center as in a display screen 310, but actually such a situation can occur that the marked position results in largely exceeding the center as in a display screen 320.

Accordingly, there have been such problems that the camera seems to have largely exceeded the center or have not been entirely controlled to the user, depending on the designated position of the image display area, and accordingly that the user feels anomalous.

SUMMARY OF THE INVENTION

An object of the present invention is to enable a user to operate a camera without feeling anomalous.

An object of the present invention is to provide a photographing control apparatus for controlling a shooting direction of camera comprising: a deriving unit configured to derive a parameter for deriving an image for displaying from a camera; and a determining unit configured to determine, based on the parameter derived by the deriving unit, as to whether the shooting direction of camera is controlled or not, according to a designation of a position, in a display area, in which the image captured by camera is displayed.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
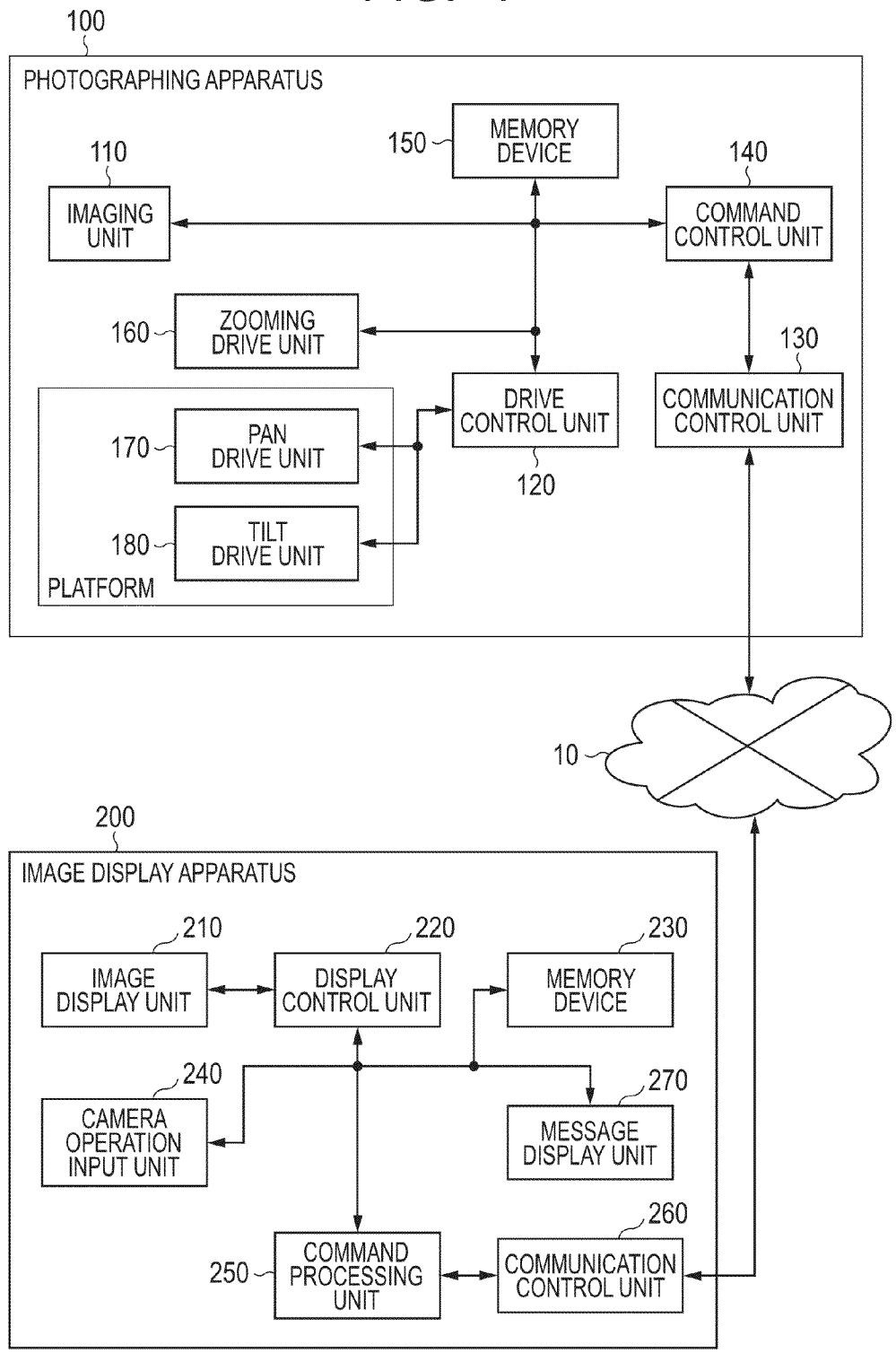
FIG. 1 is a block diagram illustrating configuration examples of an imaging apparatus and an image display apparatus according to an embodiment of the present invention.
Figure 2:
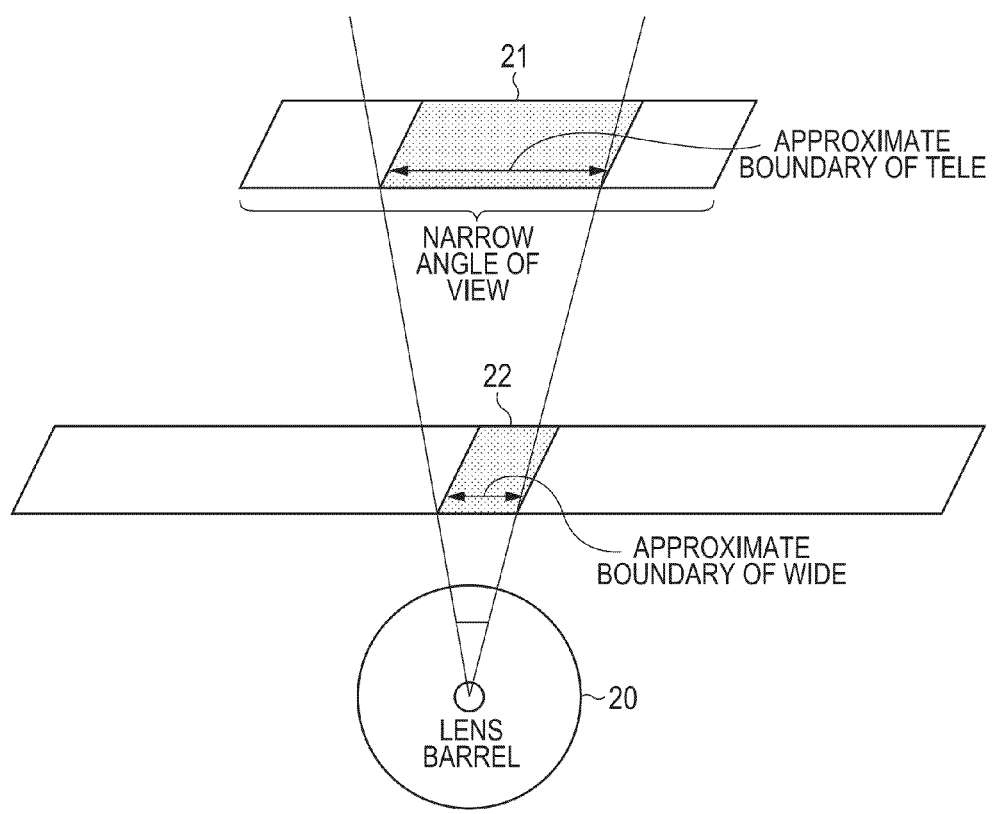
FIG. 2 is a conceptual view illustrating a relationship between a quantity of moving of a lens barrel unit and a zooming ratio.
Figure 3:
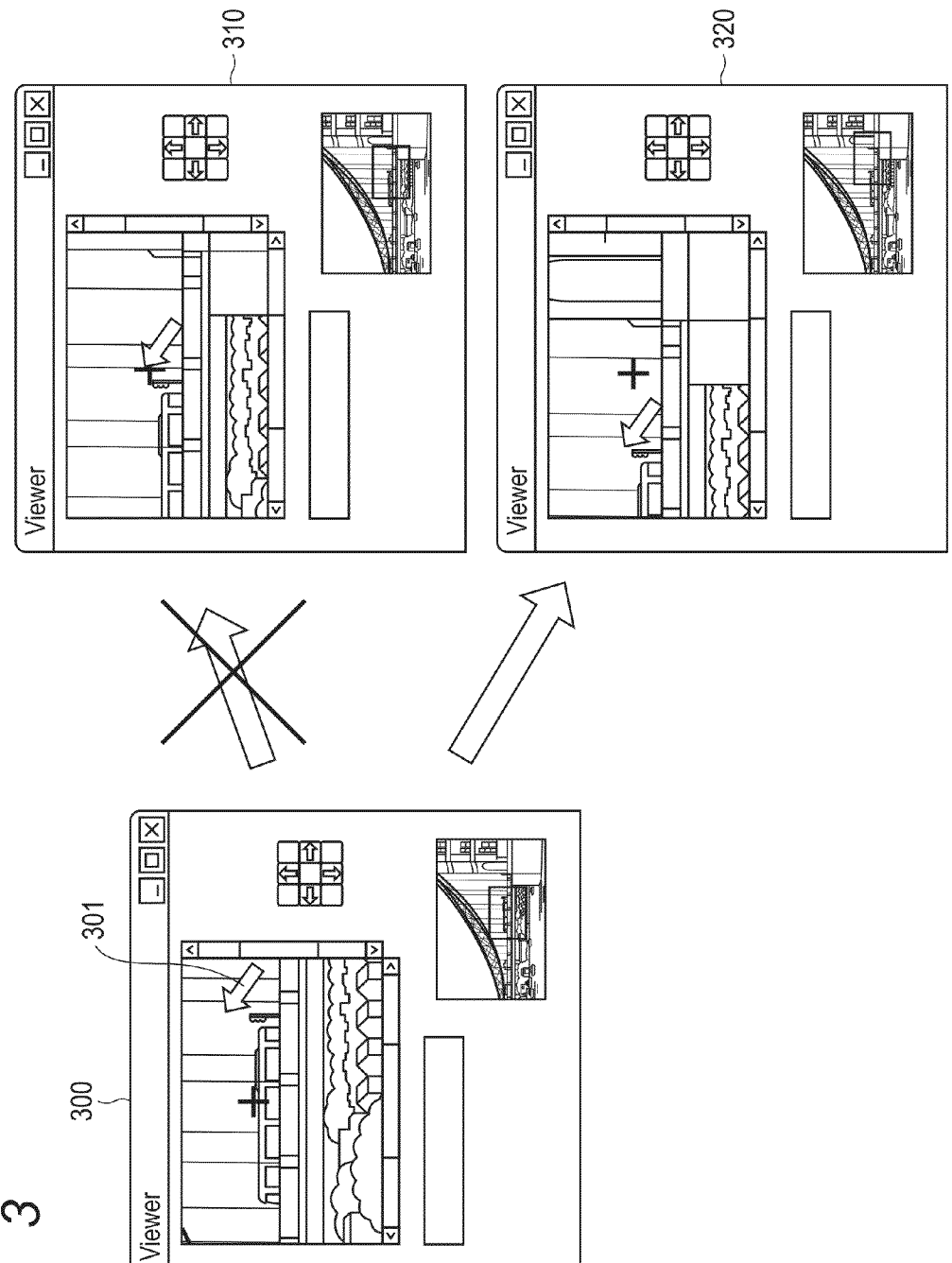
FIG. 3 is a view illustrating an example of displacement in a result of control for a camera in the image display apparatus.

A representative figure of a camera control system of the present embodiment is illustrated in FIG. 1.

An imaging apparatus 100 converts an image which has been obtained in an imaging unit 110 into an image of a particular form, in a command control unit 140, and transmits the converted image to an image display apparatus 200 from a communication control unit 130 through a network 10. Here, the particular form is a form which is defined as a command specification between the imaging apparatus 100 and the image display apparatus 200 so as to control the camera and deliver the image.

A drive control unit 120 controls the drive in the imaging apparatus 100; and a pan drive unit 170 controls pan drive, a tilt drive unit 180 controls tilt drive and a zooming drive unit 160 controls zooming drive, according to commands which the units have received from the command control unit 140, respectively.

A memory device 150 is a memory device for a permanent memory such as a flash memory and a HDD, and appropriately saves an image which has been obtained in an imaging unit 110, values of a pan, a tilt and a zoom (PTZ) which are obtained from the drive control unit 120, and the like. The pan, the tilt and the zoom are read in the drive control unit 120 when the imaging apparatus 100 is started up, and the imaging unit 110 is driven. In addition, the drive control unit 120 holds values concerning the quantity of moving of the lens barrel unit, and can provide the values to the image display apparatus 200, which will be described later.

In the image display apparatus 200, a communication control unit 260 receives command data through the network 10;

and a command processing unit 250 interprets the data, and when the interpreted data is data concerning the image, the data is output to a display control unit 220. The display control unit 220 performs digital zooming, special modification, processing for input for camera control in the image display unit 210, and the like; outputs the result to the image display unit 210; and makes the image display unit 210 display the result thereon.

For instance when the display control unit 220 performs the digital zooming processing, the display control unit 220 extracts an image in a designated area in response to the request of digital zooming, which has been input from a camera operation input unit 240; subjects the extracted image to expanding processing; and makes the image display unit 210 display the expanded image thereon. In addition, the display control unit 220 also performs the processing of displaying a lattice so as to be superimposed on the image, indicating an appropriately controllable range, and the like, which will be described later.

If the data which the command processing unit 250 has received is data concerning the camera drive, a message display unit 270 displays information concerning the camera. The pan, the tilt, the zooming value, a frame rate and the like are supposed as examples of the information.

Figure 4:
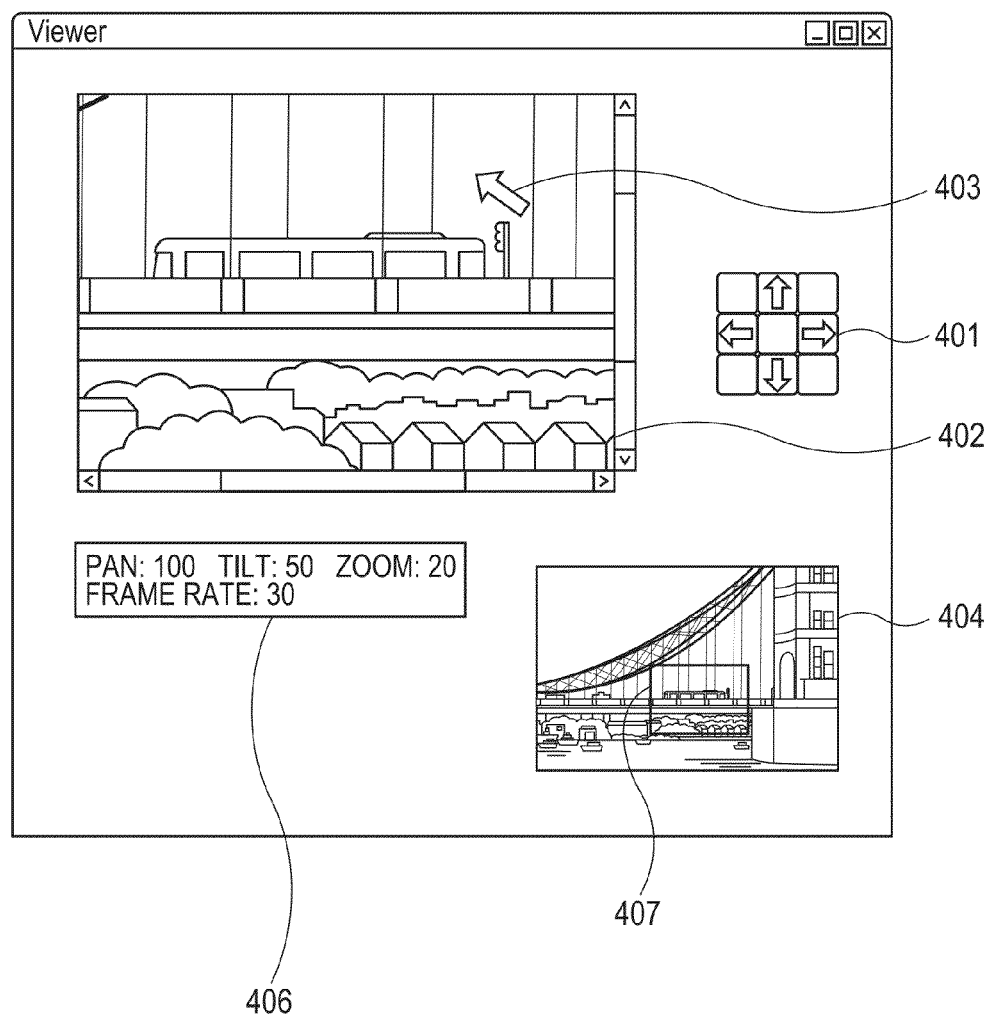
FIG. 4 is a view illustrating one example of a user interface of the image display apparatus.

FIG. 4 is a view illustrating one example of a user interface of an image display apparatus. A user controls the camera with a camera operation input unit 401, while viewing the shot image on an image display unit 402. The user can know the operated result from the fact that the image of the image display unit 402 has been updated, and from the information which is presented in a message display unit 406.

Here, the image display unit 402, the camera operation input unit 401 and the message display unit 406 in FIG. 4 correspond to the image display unit 210, the camera operation input unit 240 and the message display unit 270 in FIG. 1, respectively. The whole image display unit 404 is an area that displays the original image from which the image has been extracted when the digital zooming control has been performed. The digital zooming processing may be performed in the imaging apparatus 100 or the image display apparatus 200. When the digital zooming processing is performed in the imaging apparatus 100, the display control unit 220 does not perform the processing concerning the digital zooming.

A pointer 403 is assumed to be a mouse cursor. The display control unit makes the pointer 403 designate an arbitrary position in the display area in the image display unit 402 and thereby controls the panning and the tilting of the imaging apparatus 100 so that the designated position comes to the center. The designated position is input into the camera operation input unit 240 in a form of a coordinate, and the command processing unit 250 subjects the input position to a predetermined computation for controlling the imaging apparatus so that the designated position comes to the center, and replaces the input information with a command. The command which has been output from the command processing unit 250 is transmitted to the imaging apparatus 100 through the communication control unit 260.

The above described operations are basic operations of camera control to be conducted through the image display apparatus 200. Accordingly, the image display apparatus 200 of the present embodiment operates as a camera control apparatus.

Next, an image display system of the present embodiment will be described below.

Figure 5:
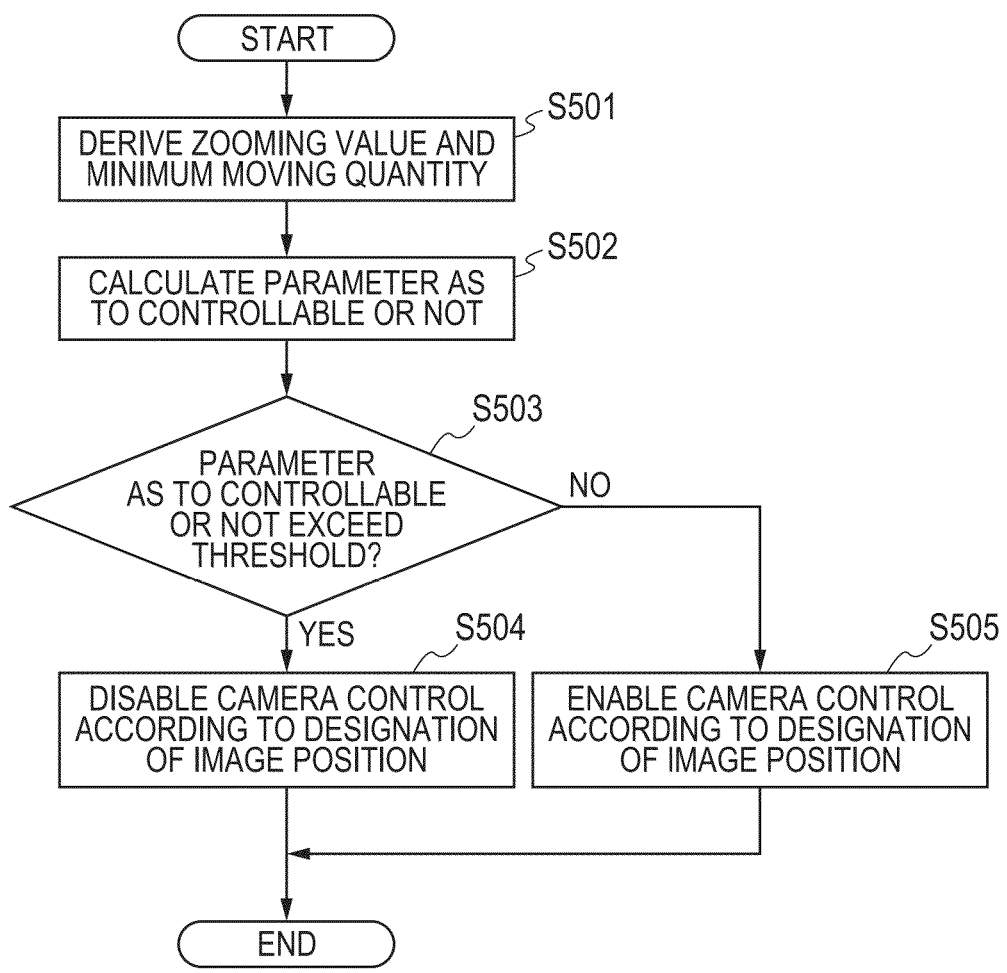
FIG. 5 is a flow chart for describing a flow in which it is determined whether the camera is controlled or not according to the designation of the position in the screen, when the image display apparatus has been started up.

FIG. 5 is a flow chart for describing a flow in which it is determined whether the camera can be controlled or not according to the designation of the position in the screen, when the image display apparatus 200 has been started up.

When the image display apparatus 200 is started up, the image display apparatus is connected to the imaging apparatus 100 through the network in S501, and derives the present zooming value and a value concerning the minimum quantity of moving of the lens barrel unit. For information, the minimum quantity of moving of the lens barrel unit may be held in the image display apparatus 200 beforehand.

Next, in S502, the display control unit calculates the present parameter as to controllable or not. The parameter as to controllable or not is designed with a parameter which is calculated from the minimum quantity of moving of the lens barrel unit and the zooming ratio, and in the present embodiment, as the minimum quantity of moving is larger and the zooming ratio is larger, the parameter becomes larger. This parameter as to controllable or not is calculated, for instance, based on the product of the minimum quantity of moving and the zooming ratio, and when the minimum quantity of moving is 1 degree and the magnification ratio of zooming is 20 times, the parameter becomes "20". When the minimum quantity of moving is 0.1 degrees and the magnification ratio of zooming is 1 time, the parameter becomes "0.1".

Incidentally, such a configuration has been described above that the image display apparatus 200 derives the present zooming value and the minimum quantity of moving of the lens barrel unit from the imaging apparatus 100, and calculates the parameter as to controllable or not from the derived present zooming value and minimum quantity of moving of the lens barrel unit, but the image display apparatus and the imaging apparatus may be configured in the following way. Specifically, it is also acceptable that the imaging apparatus 100 holds the parameter as to controllable or not, and the image display apparatus 200 derives the parameter as to controllable or not from the imaging apparatus 100.

Next, in S503, the display control unit compares the present parameter as to controllable or not, which has been calculated in S502, with a predetermined threshold, and determines as to whether the present parameter as to controllable or not is the threshold or more, or not.

The predetermined threshold represents a displacement degree which the user can allow; and may be determined by a provider of the image display apparatus, or may also be designated by the user.

This threshold is stored in a memory device 230 in the image display apparatus 200.

Suppose that the threshold has been determined to be "1", for instance. Then, in the case where the minimum quantity of moving is 0.1 degrees, when the magnification ratio of zooming has resulted in exceeding 10 times, the comparison result in S503 becomes "YES". Accordingly, the procedure advances to S504, and the display control unit disables the camera control according to the designation of the image position. Even when the position in the image has been designated by the pointer, the display control unit does not control a camera so that the position comes to the center.

In addition, when the magnification ratio of zooming is less than 10 times, the comparison result in S503 becomes "NO". Accordingly, the procedure advances to S505, and the display control unit enables the camera control according to the designation of the image position. When the position in the image is designated by the pointer, the display control unit controls the camera so that the position comes to the center.

For information, the parameter itself may be formed only of the magnification ratio of zooming, or may also be formed of the minimum quantity of moving.

In addition, the threshold in S503 may be stored in the memory device 150 of the imaging apparatus 100. When the threshold is stored in the memory device 150, the imaging apparatus 100 determines as to whether the present parameter as to controllable or not is the threshold or more, or not, and the imaging apparatus 100 may notify the determination result to the image display apparatus 200. In the case where the imaging apparatus 100 is configured in this way, the image display apparatus 200 determines as to whether the present parameter as to controllable or not is the threshold or more, or not, according to the notification, and determines as to whether the drive control unit enables or disables the camera control according to the designation of the image position. Specifically, the imaging apparatus 100 may determine as to whether the drive control unit enables or disables the camera control according to the designation of the image position.

In any case where the imaging apparatus 100 has enabled or has disabled the camera control according to the designation of the image position, the camera operation input unit 401 shall be capable of controlling the camera.

Figure 6:
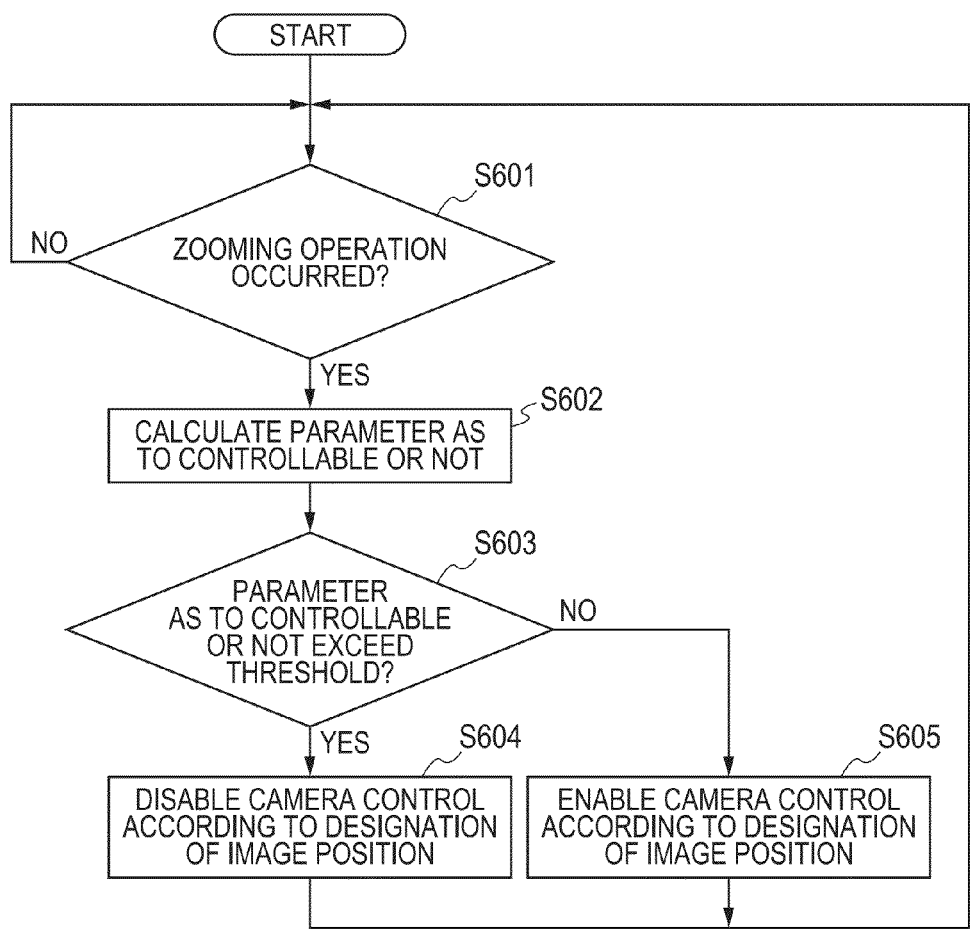
FIG. 6 is a flow chart for describing the processing at the time when a zooming control has been generated in an image display, after the image display apparatus has been started up.

FIG. 6 is a flow chart for describing the processing at the time when a user required a camera control concerning zooming, after the image display apparatus 200 has been started up.

In S601, when the zooming operation has occurred, the procedure advances to S602, and in S602, the display control unit calculates the present parameter as to controllable or not again, similarly to the description in S502 in FIG. 5. In S602, the display control unit calculates the parameter as to controllable or not based on a zooming value after the operation.

Next, in S603, the display control unit compares the present parameter as to controllable or not, which has been calculated in S602, with a predetermined threshold, and determines as to whether the present parameter as to controllable or not is the threshold or more, or not. When the magnification ratio of zooming has been increased by the zooming operation and the present parameter as to controllable or not has exceeded the threshold, the procedure advances to S604, and the display control unit disables the camera control according to the designation of the image position.

In addition, when the magnification ratio of zooming has been decreased by the zooming operation and the present parameter as to controllable or not has been less than the threshold, the procedure advances to S605, and the display control unit enables the camera control according to the designation of the image position. Then, the procedure returns to S601, and a loop which waits for the change of the zooming is repeated.

The imaging apparatus 100 also can determine as to whether the camera control according to the designation of image position is enabled or disabled.

As a specific example, when it is desired to unconditionally disable the camera control according to the designation of a position in the screen when the digital zooming operation has been enabled, the imaging apparatus 100 may define a value expressing the content in the parameter as to controllable or not, beforehand. In the case where the value is defined in this way, when the digital zooming operation has been set to be enabled, the camera control according to the designation of the position in the screen is disabled.

If the value is defined as "65535", for instance, the imaging apparatus designates 65535 in the parameter as to controllable or not. Thereby, the imaging apparatus disables the designation of the position in the screen at such a timing that the digital zoom control is enabled.

As in the above description, when the displacement between the position designated by the user and the actual camera control position becomes large, the imaging apparatus sets the control according to the designation of image position so as to be disabled. Thereby, the confusion of the user can be avoided.

It is also acceptable to change the user interface when it has been determined that the camera control according to the designation of image position is disabled. When the image display apparatus is configured in this way, the image display apparatus provides information to the user, and enables the user to perform a comfortable operation.

Figure 7:
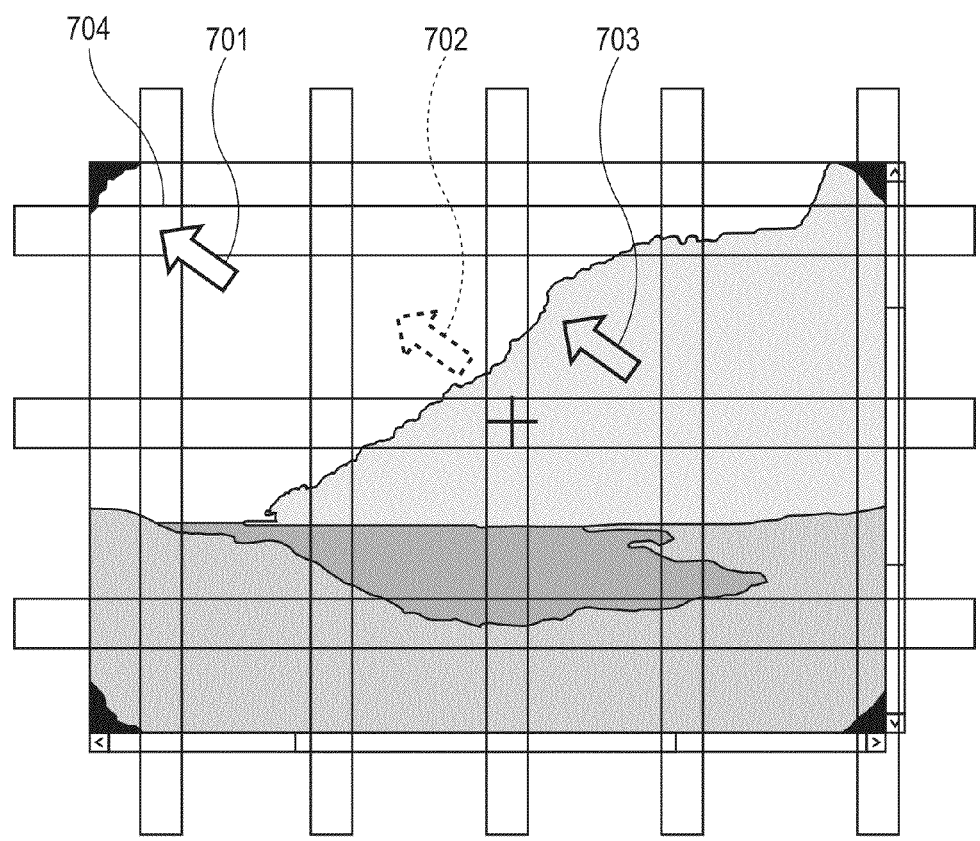
FIG. 7 is a view illustrating one example of a camera drive area in an image display area.

FIG. 7 is a view illustrating an example of a user interface which presents a range of a camera position to be supposed as a result of the designation of a position in an image area.

The image display apparatus 200 determines the parameter as to controllable or not when the image display apparatus has been started up, in a similar way to that in the first embodiment. In the first embodiment, this parameter has been used for the determination as to whether the control according to the designation of the position for the image display area is enabled or disabled, but in the second embodiment, the parameter is used for the determination as to whether the user interface is changed.

Firstly, a lattice frame display will be described below. In the case of FIG. 5, this lattice frame is applied to the case where it has been determined that the procedure is branched to S504, as a result of the determination in S503. In FIG. 6, the lattice frame is applied to the case where it has been determined that the procedure is branched to S604 from S603.

The lattice frame is calculated from the minimum quantity of moving of the lens barrel unit and the magnification ratio of zooming. The user designates an area shown by lines which constitute the frame. Thereby, it is shown that the camera can be controlled so that the designated position comes to the center.

For instance, FIG. 7 illustrates that when the user designates an area which forms the lattice shown by 704, the camera can thereby be controlled so that the designated position comes to the center. This lattice frame is generated in the display control unit 220, and the image display unit 210 displays the lattice frame on an image which has been obtained from the imaging apparatus 100, which is superposed.

In FIG. 7, 5 pieces of vertical frames and 3 pieces of horizontal frames are shown. In FIG. 7, there exist 15 areas at which the vertical frames and the horizontal frames cross. When the user designates one area out of the crossing areas, a shooting direction of the camera is changed so that the center of the screen is contained in the designated area.

In addition, there is a method of changing the shape of the pointer as an example of displaying no lattice frame. Thereby, the image display unit can provide the information to the user. For instance, when a position is designated at which the camera is assumed to be controllable according to the designation of the position so as to be expected by the user, in other words, when an area shown by 704 in FIG. 7 is designated, the pointer is clearly drawn like the pointer 701. In addition, at a position at which it is assumed that the result of the camera control according to the designation of the position does not match the expectation by the user, there are methods of expressing the pointer with a dotted line like a pointer 702, or expressing the pointer so as to be translucent like a pointer 703. In this way, the image display unit changes the shape, and thereby can provide the information on a range in which the camera can be appropriately controlled and a range in which the camera cannot be controlled, to the user.

In addition, it is also acceptable that the display control unit determines as to whether the display area in the digital zooming (in digital PTZ) is moved by the camera control or by the change of an image extracting position, based on the parameter as to controllable or not and the threshold, and selects the determined result. In the whole image display unit 404 in FIG. 4, the whole image which has been shot in the present imaging range is displayed. A display frame 407 of a digital zooming area shows an area to be extracted which is an object for digital zooming in the whole image display unit 404. The extracted area is subjected to the digital zooming processing, and is displayed on the image display unit 402.

When the imaging unit 110 in the imaging apparatus 100 performs this digital zooming processing through image processing, the image display apparatus 200 may capture the image after the zooming processing, and may display the captured image on the image display unit 210. When the image display apparatus 200 performs the digital zooming processing, the display control unit 220 subjects the area which has been designated in the whole image that has been captured by the imaging apparatus 100, to the processing, and the image display unit 210 may display the resultant image thereon. In addition, the user can change a display position, specifically, the display frame 407 of the digital zooming area and the extracting position, by designating an arbitrary position on the area in the whole image display unit 404 with the pointer of the mouse and the like.

Figure 8:
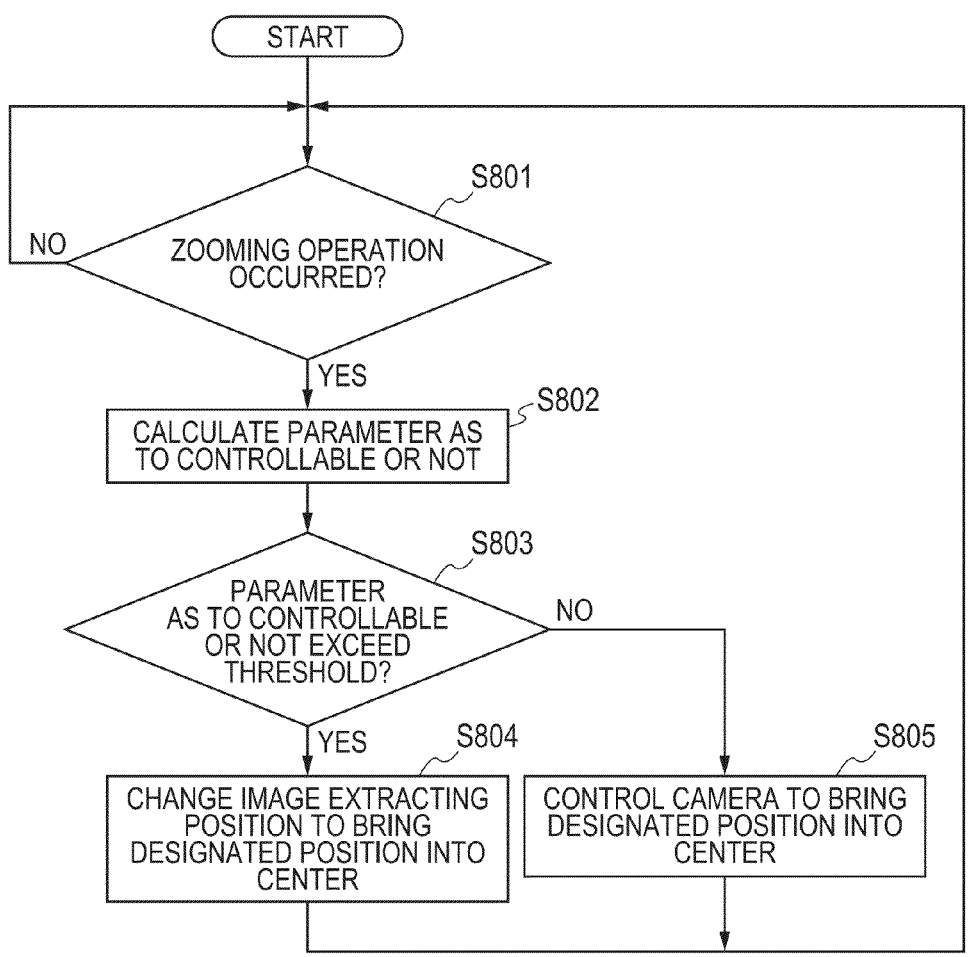
FIG. 8 is a flow chart for describing one example of a procedure in digital zooming.

A flow of the processing of the present embodiment is illustrated in a flow chart of FIG. 8.

When the zooming operation has occurred in S801, the display control unit calculates a parameter as to controllable or not, which corresponds to the present zooming ratio or the minimum quantity of moving of the lens barrel unit again, in S802.

Next, in S803, the display control unit compares the parameter as to controllable or not, which has been derived in S802, with the predetermined threshold, and determines as to whether the present parameter as to controllable or not is the threshold or more, or not. When the present parameter as to controllable or not exceeds the threshold, the camera control result cannot stop the camera in a range of a position which is expected by the user. Accordingly, the display control unit changes only the extracting position in S804, and thereby provides a digital zooming image which is desired by the user.

Figure 9:
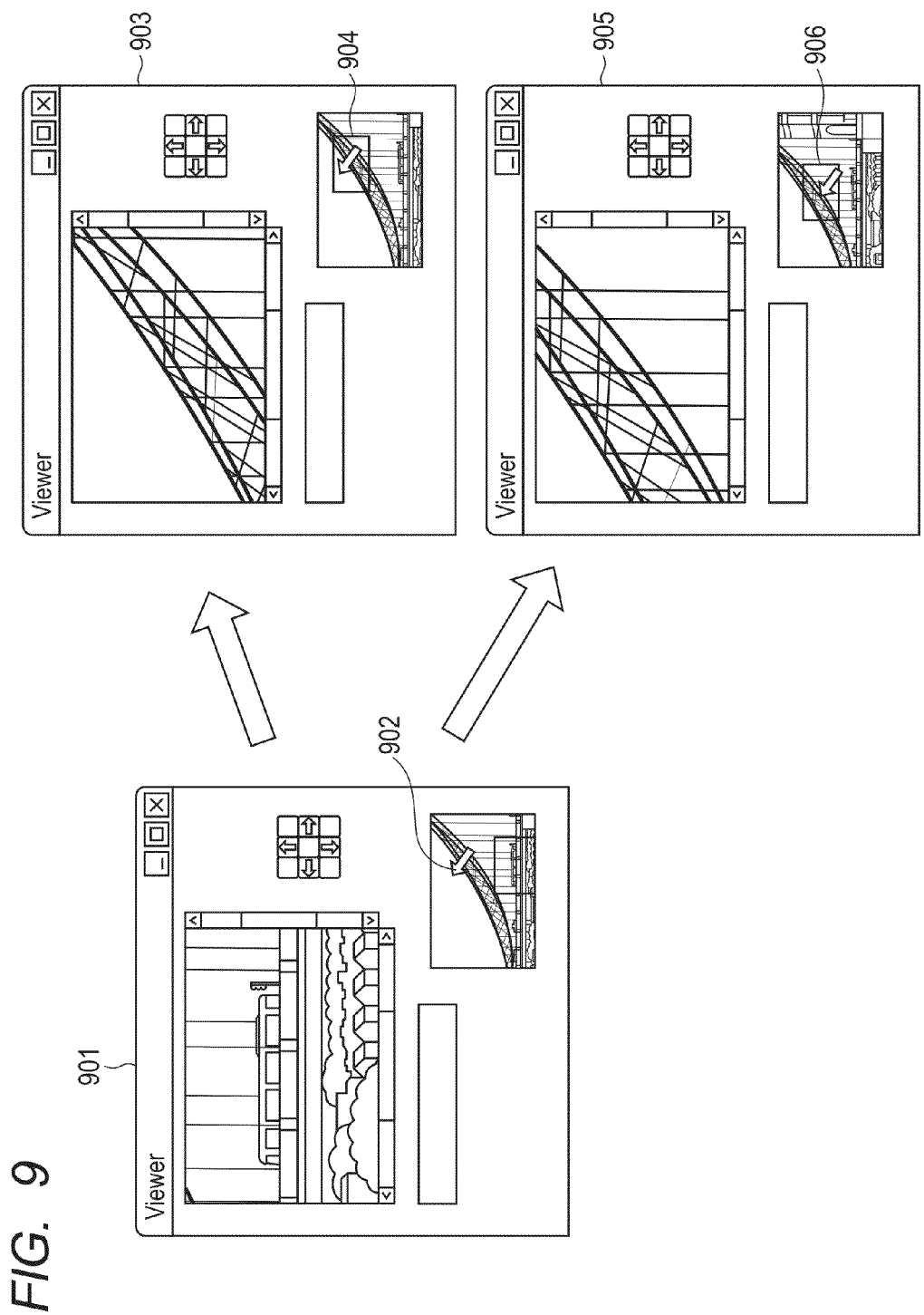
FIG. 9 is a view illustrating one example of a user interface in the digital zooming.

This state corresponds to 903 in FIG. 9. When the user designates the position of the pointer 902 in an image display screen 901, the whole image is not updated by the change of the extracting position, and only the extracting position is moved to the position of a display frame 904.

On the other hand, when the present parameter as to controllable or not does not exceed the threshold, the camera control result can stop the camera in a range of the position which is expected by the user. Because of this, the display control unit controls the shooting direction of the camera so that the designated position comes to the center, in S805, and changes the extracting position of the image to be captured to the center. Thereby, an image desired by the user is provided.

This state corresponds to 905 in FIG. 9. When the user designates the position of the pointer 902 in the image display screen 901, the camera is controlled so that the designated position comes to the center, and the whole image is updated. In addition, a display frame 906 of the digital zooming area, which shows the extracting position in the whole image, is also changed to the center.

As in the above description, the display control unit determines as to whether only the extracting position is changed or the extracting position is changed which is accompanied by the camera control, based on the parameter as to controllable or not, and can provide the image which is desired by the user.

In addition, in the above described embodiment, the example has been described in which the imaging apparatus 100 and the image display apparatus 200 are connected to each other through the network 10, but the imaging apparatus 100 and the image display apparatus 200 may be configured so as to be integrated, or may also be configured so as to be connected to each other through a control line.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-143432, filed Jun. 26, 2012, which is hereby incorporated by reference herein in its entirety.

What is claimed is:

1. A photographing control apparatus for controlling a shooting direction of a camera comprising:
    a deriving unit configured to derive a parameter for deriving an image for displaying from the camera; and
    a determining unit configured to determine, based on the parameter derived by the deriving unit, as to whether the shooting direction of the camera is controlled or not, according to a designation of a position, in a display area, in which the image captured by the camera is displayed.

2. The photographing control apparatus according to claim 1, wherein the deriving unit derives a magnification ratio of zooming, and the determining unit determines, based on the magnification ratio derived by the deriving unit, as to whether the shooting direction of the camera is controlled or not, according to the designation of the position, in the display area, in which the image captured by the camera is displayed.

3. The photographing control apparatus according to claim 1, wherein the deriving unit derives a quantity of moving the camera in the shooting direction, and the determining unit determines, based on the quantity of moving derived by the deriving unit, as to whether the shooting direction of the camera is controlled or not, according to the designation of the position, in the display area, in which the image captured by the camera is displayed.

4. The photographing control apparatus according to claim 1, wherein the deriving unit derives a parameter indicating an execution of a digital size change of the image captured by the camera, and the determining unit determines, based on the parameter derived by the deriving unit, as to whether the shooting direction of the camera is controlled or not, according to the designation of the position, in the display area, in which the image captured by the camera is displayed.

5. The photographing control apparatus according to claim 1, wherein the determining unit displays, in the display area in which the image captured by the camera is displayed, a pointer indicating whether the shooting direction of the camera is controlled or not, according to the designation of the position in the display area, in which the image captured by the camera is displayed.

6. The photographing control apparatus according to claim 1, wherein, when the shooting direction of the camera is not controlled, according to the designation of the position, in the display area, in which the image captured by the camera is displayed, a range, in which a part extracted from the image captured by the camera is displayed, is determined according to the designation of the position, in the displaying area, in which the image captured by the camera is displayed.

7. The photographing control apparatus according to claim 1, wherein the determining unit determines, based on the parameter derived by the deriving unit, a partial area within the displaying area, in which the shooting direction of the camera is controllable, according to the designation of the position, in the display area, in which the image captured by the camera is displayed.

8. A photographing control method for controlling a shooting direction of a camera comprising:
deriving a parameter for deriving an image for displaying from the camera; and
determining, based on the derived parameter, as to whether a shooting direction of the camera is controlled or not, according to a designation of a position, in a display area, in which the image captured by the camera is displayed.

9. The photographing control method according to claim 8, wherein the deriving is performed to derive a magnification ratio of zooming, and the determining is performed to determine, based on the magnification ratio derived, as to whether the shooting direction of the camera is controlled or not, according to the designation of the position, in the display area, in which the image captured by the camera is displayed.

10. The photographing control method according to claim 8, wherein the deriving is performed to derive a quantity of moving the camera in the shooting direction, and the determining is performed to determine, based on the quantity of moving derived, as to whether the shooting direction of the camera is controlled or not, according to the designation of the position, in the display area, in which the image captured by the camera is displayed.

11. The photographing control method according to claim 8, wherein the deriving is performed to derive a parameter indicating an execution of a processing of changing electronically a size of the image captured by the camera, and the determining is performed to determine, based on the derived parameter, as to whether the shooting direction of the camera is controlled or not, according to the designation of the position, in the display area, in which the image captured by the camera is displayed.

12. The photographing control method according to claim 8, wherein the determining is performed to display, in the display area in which the image captured by the camera is displayed, a pointer having indicating whether the shooting direction of the camera is controlled or not, according to the designation of the position in which the image captured by the camera is displayed.

13. A non-transitory computer readable recording medium storing a computer program for controlling a shooting direction of a camera, wherein the computer program executes:
deriving a parameter for deriving an image for displaying from the camera; and
determining, based on the derived parameter, as to whether a shooting direction of the camera is controlled or not, according to a designation of a position, in a display area, in which the image captured by the camera is displayed.

14. The recording medium according to claim 13, wherein the deriving is performed to derive a magnification ratio of zooming, and the determining is performed to determine, based on the magnification ratio derived, as to whether the shooting direction of the camera is controlled or not, according to the designation of the position, in the display area, in which the image captured by the camera is displayed.

15. The recording medium according to claim 13, wherein the deriving is performed to derive a quantity of moving the camera in the shooting direction, and the determining is performed to determine, based on the quantity of moving derived, as to whether the shooting direction of the camera is controlled or not, according to the designation of the position, in the display area, in which the image captured by the camera is displayed.

16. The recording medium according to claim 13, wherein the deriving is performed to derive a parameter indication an execution of a digital size change of the image captured by the camera, and the determining is performed to determine, based on the derived parameter, as to whether the shooting direction of the camera is controlled or not, according to the designation of the position, in the display area, in which the image captured by the camera is displayed.

17. The recording medium according to claim 13, wherein the determining is performed to display, in the display area in which the image captured by the camera is displayed, a pointer having indicating whether the shooting direction of the camera is controlled or not, according to the designation of the position in the display area, in which the image captured by the camera is displayed.

18. A control apparatus for controlling a shooting direction for shooting an image, comprising:
an acquiring unit configured to acquire image data corresponding to the shot image; and
a determining unit configured to determine, based on a zooming ratio for shooting the image, whether or not the shooting direction is controlled in accordance with a designation of a position in a display area in which the image data acquired by the acquiring unit is displayed.

19. The apparatus according to claim 18, wherein the determining unit is configured to determine, based on the zooming ratio for shooting the image and ability for changing the shooting direction, whether or not the shooting direction is controlled in accordance with the designation of the position in the display area in which the image data acquired by the acquiring unit is displayed.

20. The apparatus according to claim 19, further comprising a display control unit configured to display a symbol for indicating a position in the display area in accordance with whether or not the shooting direction is controlled in accordance with the designation of the position in the display area.

21. The apparatus according to claim 18, wherein the acquiring unit is configured to acquire the zooming ratio of a shooting apparatus for shooting the image.

22. The apparatus according to claim 18, wherein the acquiring unit is configured to acquire the image data via a network from a shooting apparatus for shooting the image.

23. The apparatus according to claim 18, further comprising an output unit configured to output the image data acquired by the acquiring unit for displaying the image data in the display area.

24. The apparatus according to claim 18, further comprising a detection unit configured to detect the designated position in the display area in which the image data acquired by the acquiring unit is displayed.

25. A method for controlling a shooting direction for shooting an image, comprising:
   acquiring shooting data corresponding to a zooming ratio for shooting the image; and
   determining, based on the shooting data corresponding to the zooming ratio, whether or not the shooting direction is controlled in accordance with a designation of a position in a display area in which the acquired image data is displayed.

26. The method according to claim 25, wherein it is determined, based on the zooming ratio for shooting the image and ability for changing the shooting direction, whether or not the shooting direction is controlled in accordance with the designation of the position in the display area in which the acquired image data is displayed.

27. The method according to claim 25, wherein the shooting data is acquired via a network from a shooting apparatus for shooting the image.

28. A non-transitory computer readable recording medium storing a computer program for controlling a shooting direction for shooting an image, the computer program executing:
   acquiring shooting data corresponding to a zooming ratio for shooting the image; and
   determining, based on the shooting data corresponding to the zooming ratio, whether or not the shooting direction is controlled in accordance with a designation of a position in a display area in which the acquired image data is displayed.

29. The medium according to claim 28, wherein it is determined, based on the zooming ratio for shooting the image and ability for changing the shooting direction, whether or not the shooting direction is controlled in accordance with the designation of the position in the display area in which the acquired image data is displayed.

30. The medium according to claim 28, wherein the shooting data is acquired via a network from a shooting apparatus for shooting the image.

\* \* \* \* \*